(12) United States Patent
Rak et al.

(10) Patent No.: US 7,363,064 B2
(45) Date of Patent: Apr. 22, 2008

(54) ASYMMETRIC HANDHELD ELECTRONIC DEVICE

(75) Inventors: Roman P. Rak, Waterloo (CA); Frank Tyneski, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 439 days.

(21) Appl. No.: 11/119,010

(22) Filed: Apr. 29, 2005

(65) Prior Publication Data
US 2006/0246954 A1 Nov. 2, 2006

(51) Int. Cl.
*H04M 1/00* (2006.01)
(52) U.S. Cl. ............................ 455/575.1; 455/575.5; 455/575.8; 455/90.3; 379/330; 379/428.01
(58) Field of Classification Search ............ 455/575.1, 455/575.5, 575.8, 90.3; 379/330, 428.01
See application file for complete search history.

(56) References Cited

U.S. PATENT DOCUMENTS

| | | | | |
|---|---|---|---|---|
| 4,706,273 A | * | 11/1987 | Spear et al. | 455/569.2 |
| 4,870,676 A | * | 9/1989 | Lewo | 455/564 |
| 4,875,229 A | * | 10/1989 | Palett et al. | 455/569.2 |
| 5,703,947 A | * | 12/1997 | Hino et al. | 379/419 |
| 6,421,234 B1 | * | 7/2002 | Ricks et al. | 361/683 |
| 6,701,159 B1 | * | 3/2004 | Powell | 455/575.8 |
| 6,751,473 B1 | * | 6/2004 | Goyal et al. | 455/556.1 |
| 7,257,422 B2 | * | 8/2007 | Loprete | 455/550.1 |
| 2002/0142795 A1 | * | 10/2002 | Imahori et al. | 455/550 |
| 2003/0095657 A1 | * | 5/2003 | Laaksonen | 379/419 |
| 2003/0134666 A1 | * | 7/2003 | Fletcher et al. | 455/568 |
| 2003/0138097 A1 | * | 7/2003 | Fuhrmann et al. | 379/428.01 |

(Continued)

FOREIGN PATENT DOCUMENTS

WO WO 2005/006718 A 1/2005

OTHER PUBLICATIONS

ANONYMOUS "Nokia 3300 User Guide" [Online] Jun. 2003, Nokia, XP002346249. pp. 15-16. Retrieved from the internet at URL http://nds2.nokia.com/files/support/nam/phone/guides/3300_US_en.PDF> on Sep. 22, 2005.

(Continued)

*Primary Examiner*—Matthew Anderson
*Assistant Examiner*—Minh Dao
(74) *Attorney, Agent, or Firm*—Brij K. Agarwal; Carol A. Marmo; Eckert Seamans Cherin & Mellott, LLC

(57) ABSTRACT

An improved handheld electronic device includes a case having an asymmetry provided by an outwardly protruding corner. The handheld electronic device includes an earphone disposed at the outwardly protruding corner. The positioning of the earphone allows a user to rapidly locate the with respect to the user's ear. Additionally, by positioning the earphone at a protruding corner of the handheld electronic device, the protruding corner can be positioned at an inner location of the user's outer ear, which is more comfortable to the user than positioning the handheld electronic device atop the outer ear. The earphone is offset from a main axis of the handheld electronic device in a direction generally toward the side of the handheld electronic device on which the outwardly protruding corner is disposed. In a second embodiment, a display of the handheld electronic device is offset from a main axis thereof in a second direction away from the offset earphone.

29 Claims, 2 Drawing Sheets

U.S. PATENT DOCUMENTS

2005/0253260 A1* 11/2005 Yuzawa .................. 257/734

OTHER PUBLICATIONS

ANONYMOUS "Nokia N-GAGE QD User's Guide" [Online] Dec. 2004, Nokia, XP002346250. p. 12. Retrieved from the internet at URL http://www.n-gage.com/en-R1/support/NGageQd/userguide.htm> on Sep. 22, 2005.

* cited by examiner ated with the asymmetry provided by an outwardly protruding corner. The handheld electronic device includes an earphone disposed at the outwardly protruding corner. The positioning of the earphone allows a user to rapidly locate the earphone with respect to the user's ear. Additionally, by positioning the earphone at a protruding corner of the handheld electronic device, the protruding corner can be received in an inner portion of the user's outer ear, which is relatively more comfortable to the user than positioning the handheld electronic device atop the outer ear. The earphone is offset from a main axis of the handheld electronic device in a direction generally toward a side of the handheld electronic device on which the outwardly protruding corner is disposed. In a

ASYMMETRIC HANDHELD ELECTRONIC DEVICE

BACKGROUND OF THE INVENTION

1. Field of the Invention

The invention relates generally to handheld electronic devices and, more particularly, to a handheld electronic device having an asymmetric layout.

2. Background Information

Numerous types of handheld electronic devices are known. Examples of such handheld electronic devices include, for instance, personal data assistants (PDAs), handheld computers, two-way pagers, cellular telephones, and the like. Many handheld electronic devices also feature a wireless or other communication capability, although other handheld electronic devices are stand-alone devices that are functional without communication with other devices. Such handheld electronic devices are generally intended to be portable, and thus are of a relatively compact configuration. With advances in technology, handheld electronic devices are built to have progressively smaller form factors yet have progressively greater numbers of applications and features resident thereon.

Some handheld electronic devices, such as those that may include a wireless communication capability, also include a microphone and an earphone disposed on a case of the handheld electronic device. The handheld electronic device can be held against the user's ear with the microphone disposed near the mouth such that the handheld electronic device can be operated as a telephone. While such handheld electronic devices have been generally effective for their intended purposes, such handheld electronic devices have not, however, been without limitation.

Handheld electronic devices having a built in earphone typically have the earphone disposed generally centrally on the handheld electronic device along an upper edge of a front surface thereof. While such a central positioning of the earphone provides to the handheld electronic device a symmetric appearance, such positioning of the earphone can have limitations. Depending upon the size of the device, the earphone can be difficult to position directly over the ear since the position of the earphone may not be readily apparent to a user when the handheld electronic device is disposed at the side of a person's head. Additionally, positioning the device such that a front surface thereof, such as at which the earphone would be disposed, is placed against the entire outer ear can become uncomfortable for the user. It thus would be desirable to provide an improved handheld electronic device that overcomes these and other limitations.

SUMMARY OF THE INVENTION

An improved handheld electronic device includes a case having an asymmetry provided by an outwardly protruding corner. The handheld electronic device includes an earphone disposed at the outwardly protruding corner. The positioning of the earphone allows a user to rapidly locate the earphone with respect to the user's ear. Additionally, by positioning the earphone at a protruding corner of the handheld electronic device, the protruding corner can be received in an inner portion of the user's outer ear, which is relatively more comfortable to the user than positioning the handheld electronic device atop the outer ear. The earphone is offset from a main axis of the handheld electronic device in a direction generally toward a side of the handheld electronic device on which the outwardly protruding corner is disposed. In a second embodiment, a display of the handheld electronic device is offset from a main axis thereof in a second direction away from the offset of the earphone.

Accordingly, an aspect of the invention is to provide an improved handheld electronic device having an earphone that is disposed on a case of the device and that is relatively comfortable for a user to use.

Another aspect of the invention is to provide an improved handheld electronic device having a earphone positioned on the case such that it is relatively easy for a user to locate the earphone with respect to the user's ear.

Another aspect of the invention is to provide an improved handheld electronic device having an asymmetry provided by an outwardly protruding corner, and to additionally provide an earphone on the outwardly protruding corner.

Another aspect of the invention is to provide an improved handheld electronic device having an outwardly protruding corner that includes an apex that is at least partially rounded and a pair of legs extending away from the apex, with the legs being oriented at an angle of at most about 90° with respect to one another, and possibly at an acute angle with respect to one another.

Accordingly, an aspect of the invention is to provide an improved handheld electronic device, the general nature of which can be stated as including a case, an input apparatus, and an output apparatus. The output apparatus includes an audio transducer and a display disposed on the case. The case has a front surface, and the input apparatus comprises a keypad having a plurality of keys arranged on the front surface of the case in a number of rows and columns with respect to a main axis of the case. The main axis is disposed generally centrally on the case, extends across the display, and is one of i) disposed substantially centrally along a column of keys and ii) disposed substantially between two adjacent columns of keys. The case is formed to have an outwardly protruding corner at a first side of the main axis that provides to the case an asymmetry with respect to the main axis.

BRIEF DESCRIPTION OF THE DRAWINGS

A further understanding of the invention can be gained from the following Description of the Preferred Embodiments when read in conjunction with the accompanying drawings in which.

Similar numerals refer to similar parts throughout the specification.

DESCRIPTION OF THE PREFERRED EMBODIMENTS

Figure 1:
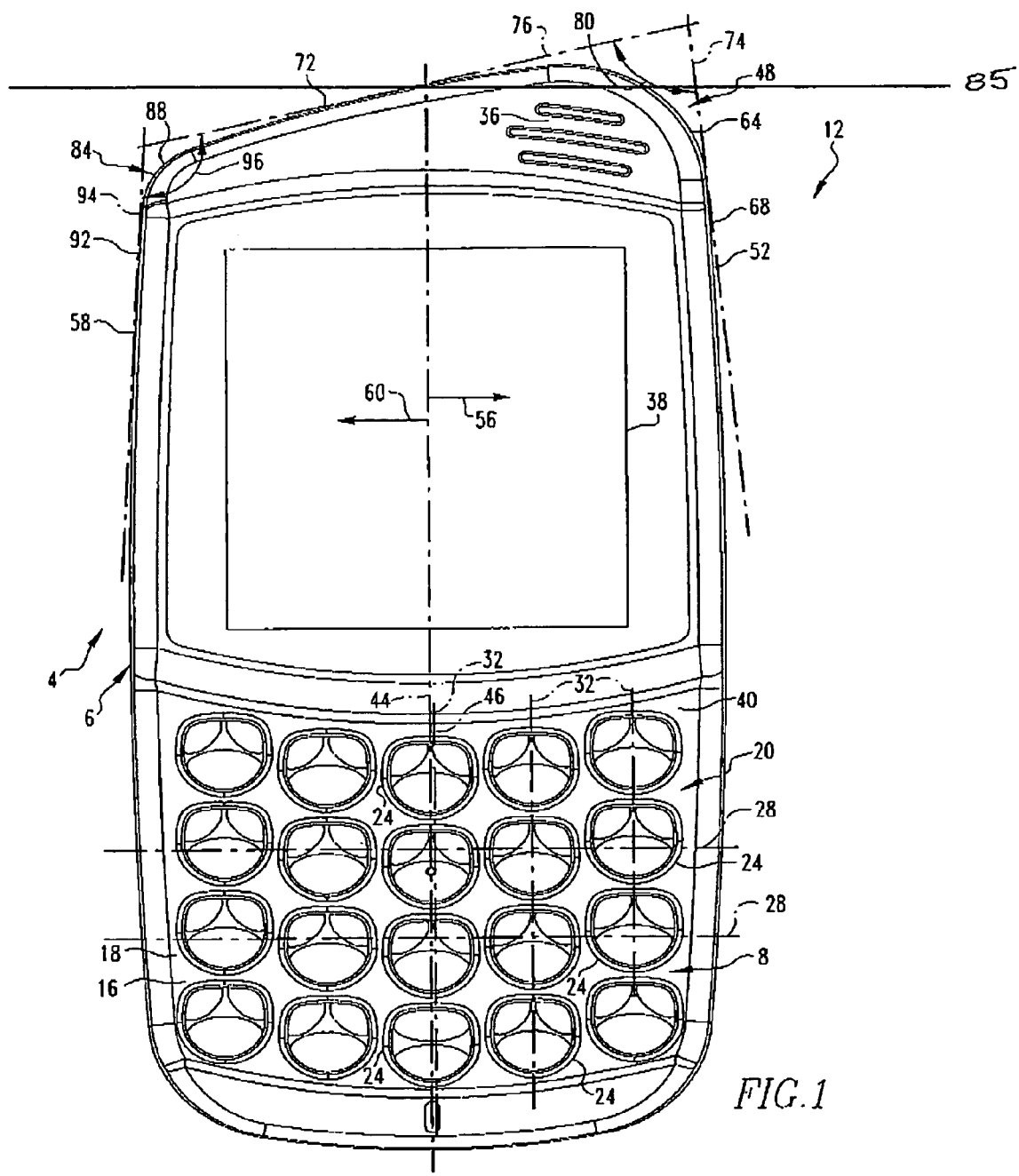
FIG. 1 is a front elevational view of an improved handheld electronic device in accordance with a first embodiment of the invention.

An improved handheld electronic device 4 is accordance with the invention is indicated generally in FIG. 1. The handheld electronic device 4 includes a case 6 upon which are disposed are an input apparatus 8, an output apparatus 12, a processor apparatus 16, and a wireless communication apparatus 18. In other embodiments, the handheld electronic device 4 may be configured to not include the processor apparatus 16 and/or the wireless communication apparatus 18 without departing from the concept of the invention. As will be set forth in greater detail below, the case 6 is configured to include an asymmetry which makes the handheld electronic device 4 more comfortable and easier to use.

The input apparatus 8 includes a keypad 20 having a plurality of keys 24 that are arranged on the case 16 in a number of rows 28 and columns 32. Numerous arrangements of the keys 24 are possible, and the layout depicted herein is purely exemplary.

The output apparatus 12 includes an audio transducer 36 that, in the present exemplary embodiment, operates in the fashion of an earphone. The audio transducer 36 itself is, in the present exemplary embodiment, disposed within an interior of the case 6 and is indicated by a grille formed in the case 6 at the location of the audio transducer 36. The output apparatus 12 additionally includes a display 36 disposed on the case 6. The output apparatus 12 can include other output devices such as lights and the like without departing from the concept of the invention.

The processor apparatus 16 in the depicted exemplary embodiment includes a processor and a memory. The processor may be, for example and without limitation, a microprocessor (μP) or other processor. The memory may be any of a wide variety of storage devices such as, for example and without limitation, RAM, ROM, EPROM, EEPROM, and/or other storage devices. The memory may have one or more applications and/or routines stored therein that are executable on the processor.

The wireless communication apparatus 18 can provide, for example, GSM, GPRS, Bluetooth, Wi-Fi, and/or other wireless communication capability without limitation. An exemplary use of the wireless communication apparatus 18 may be in the context of a telephone application on the handheld electronic device 4, although numerous other types of communication contexts are possible without departing from the concept of the invention.

The case 6 includes a front surface 40 on which the keys 24 are disposed and generally at which the display 38 is disposed. The case 6 also includes a main axis 44 extending generally centrally and longitudinally along the case 6. In the exemplary embodiment depicted herein, the main axis 44 is disposed substantially centrally along a central column 46 of the keys 24 from among the plurality of columns 32. It is noted that the dot-dash line used to indicate the central column 46 is spaced slightly from the main axis 44 for purposes of clarity. In the present exemplary embodiment, the axis 44 also extends across the display 38. It is noted that in other embodiments of the invention, such as might include an even quantity of columns of keys, for example, might have a main axis that is disposed substantially between a pair of adjacent columns of keys.

In accordance with the invention, the case 6 includes an outwardly protruding corner 48 that is disposed at a first side 52 of the case 6 and that provides to case 6 an asymmetry. That is, the case 6 generally is symmetric about the main axis 44 except for the upper regions of the case 6, i.e., from the perspective of FIG. 1, wherein the outwardly protruding corner 48 is a protrusion of the case 6 in a direction generally parallel with the main axis 44. In the exemplary embodiment illustrated in FIG. 1, outwardly protruding corner 48 protrudes outwards from the case 6 above (or beyond) a case upper axial dimensional limit 85 defined by the intersection of the main axis 44 and the second leg 72, and being perpendicular to the main axis 44. The outward protrusion of outwardly protruding corner 48 is in a direction generally parallel with the main axis 44. The case 6 also includes a second corner 84 adjacent the outwardly protruding corner 48 and disposed at a second side 58 of the case 6. It can be seen that the outwardly protruding corner 48 and the second corner 84 are asymmetric with respect to the main axis 44. The first side 52 is disposed in a first direction 56 from the main axis 44, and the second side 58 is disposed in a second direction 60 from the main axis 44.

The audio transducer 36 is disposed substantially at the outwardly protruding corner 48. Such positioning of the audio transducer 36 facilitates use of the handheld electronic device 4 by a user and additionally makes such use relatively more comfortable when compared with other devices having earphones generally centrally disposed at an upper edge of a symmetric case. That is, the outwardly protruding corner 48 can be received in an inner region of the user's outer ear. This allows a user to rapidly locate the audio transducer 36 on the ear at a location where the user will be able to hear output from the audio transducer 36. Additionally, such positioning avoids the case 6 being disposed entirely on an outer region of the outer ear, thus making such use relatively more comfortable.

The outwardly protruding corner 48 can be said to have an apex 64 that is at least partially rounded, and to further include a first leg 68 and a second leg 72 extending away from the apex 64. The first leg 68 can be said to lie generally along a first axis 74 extending from the apex 64, and the second leg 72 can be said to lie generally along a second axis 76 extending from the apex 64. While it can be seen that the first leg 68 and the second leg 72 are not straight, and rather are at least slightly curved, the elongation of the first leg 68 lies generally along the first axis 74, and the elongation of the second leg 72 lies generally along the second axis 76.

It can be seen that the exemplary first axis 74 and second axis 76 are oriented at a first angle 80 with respect to one another. The exemplary first angle 80 is an acute angle, meaning that the angle is less than 90°. The relative sharpness of the outwardly protruding corner 48 facilitates the outwardly protruding corner 48 being readily positioned at the inner region of the outer ear, and makes use of the handheld electronic device 4 relatively comfortable. The first angle 80 can be up to about 90° while still providing the benefits described herein, although other configurations of the outwardly protruding corner 48 can be provided while still being within the scope of the invention.

The second corner 84 can be said to include an at least partially rounded apex 88 and to have the second leg 72 and a third leg 92 extending away from the apex 88. The third leg 92 is elongated and is disposed generally along a third axis 94. The second axis 76 and third axis 94 are oriented at a second angle 96 with respect to one another. In the present exemplary embodiment, the second angle 96 is an obtuse angle, meaning that the angle in excess of 90°.

A comparison between the outwardly protruding corner 48 and the second corner 84 illustrates the aforementioned asymmetry in the case 6. It can be seen that the second leg 72, which extends generally between the apex 64 of outwardly protruding corner 48 and the apex 88 of the second corner 84, is oriented oblique to the main axis 44. As employed herein the expression "oblique" and variations thereof shall refer generally to a relationship that is either perpendicular nor parallel. More specifically, it can be seen that the second leg 72 is disposed with respect to the main axis 44 such that every tangent along second leg 72 is oriented oblique to the main axis 44. Such a relationship further illustrates the asymmetry between the outwardly protruding corner 48 and the second corner 84, and the general asymmetry of the case 6 itself.

The audio transducer 36 can be seen to be offset in the first direction 56 from the main axis 44. That is, the main axis 44 does not lie over precisely the center of the audio transducer 36. In the present example, the main axis 44 does not overlie any portion of the audio transducer 36. However, in other embodiments of the invention, the main axis 44 could still overlie at least a portion of the audio transducer 36 with the audio transducer 36 still being offset from the main axis 44.

It thus can be seen that the asymmetry of the case 6 and the positioning of the audio transducer 36 at an outwardly protruding corner 48 at a location offset from the central axis 44 allows the user to more readily locate the audio transducer 36 with respect to the user's ear, and also allows the user to use the handheld electronic device 4 with a greater degree of comfort. Such ease of use and comfort desirably encourages use by the user.

Figure 2:
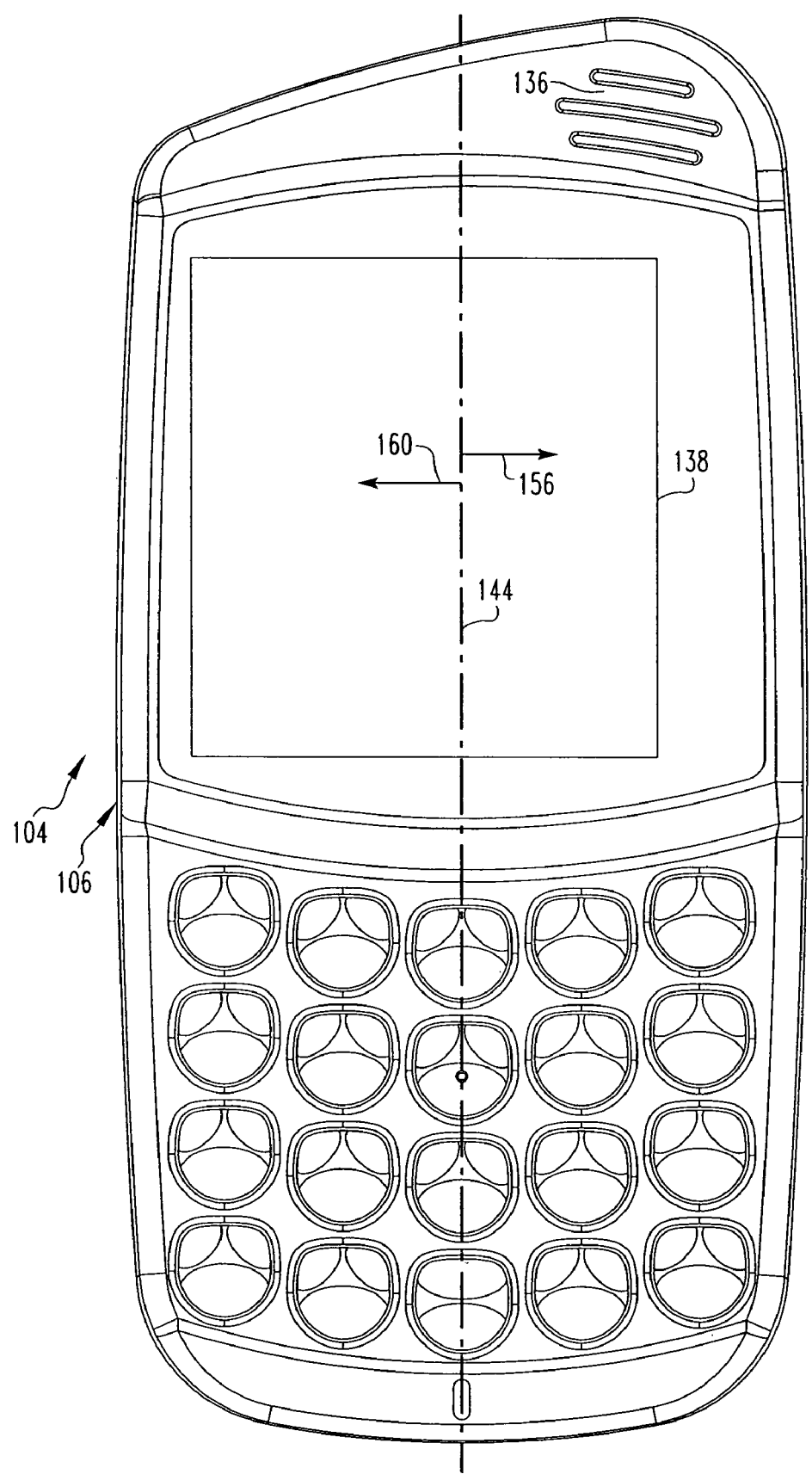
FIG. 2 is a front elevational view of an improved handheld electronic device in accordance with a second embodiment of the invention.

A second embodiment of handheld electronic device 104 is depicted generally in FIG. 2. The handheld electronic device 104 is similar to the handheld electronic device 4 in that it includes the same asymmetric case as the handheld electronic device 4. The audio transducer 136 is similarly offset in a first direction 156 from the main axis 144. However, the display 138 of the handheld electronic device 104 is offset in a second direction 160 from the main axis 144, it being noted that the main axis 144 still overlies a portion of the offset display 138. As such, the audio transducer 136 and the display 138 are, in the present depicted exemplary embodiment, each offset in opposite directions from the main axis 144. Such opposite offsetting can provide to the handheld electronic device 104 an aspect of symmetry which may at least partially counteract perception of the asymmetric configuration of its case 106.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A handheld electronic device comprising:
a case having a front surface;
an input apparatus; and
an output apparatus comprising an audio transducer and a display disposed on the case;
the input apparatus comprising a keypad having a plurality of keys arranged on the front surface of the case in a number of rows and columns with respect to a main axis of the case, the main axis being disposed generally centrally on the case, extending across the display, and being one of:
disposed substantially centrally along a column of keys; and
disposed substantially between two adjacent columns of keys;
the case being formed to have an outwardly protruding corner at a first side of the main axis that provides to the case an asymmetry with respect to the main axis;
wherein the protruding corner comprises an at least partially rounded apex, an elongated first leg, and an elongated second leg, the first leg being oriented generally oblique to the main axis, and
the case being formed to have a second corner adjacent the outwardly protruding corner and disposed at a second side of the main axis, the second leg extending generally between the apex of the outwardly protruding corner and the apex of the second corner, substantially all tangents to the second leg being oriented oblique to the main axis.

2. The handheld electronic device of claim 1 wherein the audio transducer is disposed on the outwardly protruding corner at a location offset from the main axis in a direction toward the first side.

3. The handheld electronic device of claim 1 wherein the first leg and the second leg extend from the apex along a first axis and a second axis, respectively, oriented at most at about ninety degrees with respect to one another.

4. The handheld electronic device of claim 3 wherein the first axis and the second axis are oriented at an acute angle with respect to one another.

5. The handheld electronic device of claim 1 wherein the protruding corner protrudes away from the display in a direction generally parallel with the main axis.

6. The handheld electronic device of claim 1 wherein the second corner comprises an at least partially rounded apex.

7. The handheld electronic device of claim 1 wherein the second corner includes a third leg extending from the apex thereof, the third leg extending along a third axis, the second axis and the third axis being oriented at an obtuse angle with respect to one another.

8. The handheld electronic device of claim 1 wherein the display is offset from the main axis in a direction away from the first side.

9. The handheld electronic device of claim 1 wherein the audio transducer is indicated by at least one opening being formed in the front surface of the ease at a location offset from the main axis in a direction toward the first side.

10. The handheld electronic device of claim 9 wherein the opening comprises a plurality of elongated parallel openings.

11. A handheld electronic device comprising:
a case having a front surface;
an input apparatus; and
an output apparatus comprising an audio transducer and a display disposed on the case;
the input apparatus comprising a keypad having a plurality of keys arranged on the front surface of the case in a number of rows and columns with respect to a main axis of the case, the main axis being disposed generally centrally on the case, extending across the display, and being one of:
disposed substantially centrally along a column of keys; and
disposed substantially between two adjacent columns of keys;
the case being formed to have an outwardly protruding corner at a first side of the main axis that provides to the case an asymmetry with respect to the main axis,
wherein the audio transducer is indicated by at least one opening being formed in the front surface of the case at a location offset from the main axis in a direction toward the first side.

12. The handheld electronic device of claim 11 wherein the protruding corner comprises an at least partially rounded apex, an elongated first leg, and an elongated second leg, the first leg being oriented generally oblique to the main axis.

13. The handheld electronic device of claim 12 wherein the first leg and the second leg extend from the apex along a first axis and a second axis, respectively, oriented at most at about ninety degrees with respect to one another.

14. The handheld electronic device of claim 13 wherein the first axis and the second axis are oriented at an acute angle with respect to one another.

15. The handheld electronic device of claim 12 wherein the case is formed to have a second corner adjacent the outwardly protruding corner and disposed at a second side of the main axis, the second corner having an at least partially rounded apex, the second leg extending generally between the apex of the outwardly protruding corner and the apex of the second corner, substantially all tangents to the second leg being oriented oblique to the main axis.

16. The handheld electronic device of claim 15 wherein the second corner includes a third leg extending from the apex thereof the third leg extending along a third axis, the second axis and the third axis being oriented at an obtuse angle with respect to one another.

17. The handheld electronic device of claim 11 wherein the protruding corner protrudes away from the display in a direction generally parallel with the main axis.

18. The handheld electronic device of claim 11 wherein the display is offset from the main axis in a direction away from the first side.

19. The handheld electronic device of claim 11 wherein the opening comprises a plurality of elongated parallel openings.

20. A handheld electronic device comprising:
a case having a front surface;
an input apparatus; and
an output apparatus comprising an audio transducer and a display disposed on the case;
the input apparatus comprising a keypad having a plurality of keys arranged on the front surface of the case in a number of rows and columns with respect to a main axis of the case, the main axis being disposed generally centrally on the case, extending across the display, and being one of:
  disposed substantially centrally along a column of keys; and
  disposed substantially between two adjacent columns of keys;
the case being formed to have an outwardly protruding corner at a first side of the main axis that provides to the case an asymmetry with respect to the main axis; said outwardly protruding corner protruding outward above a case upper axial dimensional limit.

21. The handheld electronic device of claim 20 wherein the protruding corner comprises an at least partially rounded apex, an elongated first log, and an elongated second leg, the first leg being oriented generally oblique to the main axis.

22. The handheld electronic device of claim 21 wherein the first leg and the second leg extend from the apex along a first axis and a second axis, respectively, oriented at most at about ninety degrees with respect to one another.

23. The handheld electronic device of claim 22 wherein the first axis and the second axis are oriented at an acute angle with respect to one another.

24. The handheld electronic device of claim 21 wherein the case is formed to have a second corner adjacent the outwardly protruding corner and disposed at a second side of the main axis, the second corner having an at least partially rounded apex, the second leg extending generally between the apex of the outwardly protruding corner and the apex of the second corner, substantially all tangents to the second leg being oriented oblique to the main axis.

25. The handheld electronic device of claim 24 wherein the second corner includes a third leg extending from the apex thereof, the third leg extending along a third axis, the second axis and the third axis being oriented at an obtuse angle with respect to one another.

26. The handheld electronic device of claim 20 wherein the protruding corner protrudes away from the display in a direction generally parallel with the main axis.

27. The handheld electronic device of claim 20 wherein the display is offset from the main axis in a direction away from the first side.

28. The handheld electronic device of claim 20 wherein the audio transducer is indicated by at least one opening being formed in the front surface of the case at a location offset from the main axis in a direction toward the first side.

29. The handheld electronic device of claim 28 wherein the opening comprises a plurality of elongated parallel openings.

* * * * *

UNITED STATES PATENT AND TRADEMARK OFFICE
CERTIFICATE OF CORRECTION

PATENT NO. : 7,363,064 B2  Page 1 of 1
APPLICATION NO. : 11/119010
DATED : April 22, 2008
INVENTOR(S) : Roman P. Rak et al.

It is certified that error appears in the above-identified patent and that said Letters Patent is hereby corrected as shown below:

Cover Page, Abstract, line 5, delete "the with" and insert therefor -- the earphone with --;

Column 2, line 9, delete "a" and insert therefor -- an --;

Column 2, line 58, delete "is" and insert therefor -- in --; and

Column 8, line 3, claim 21, delete "log" and insert therefor -- leg --.

Signed and Sealed this

First Day of June, 2010

David J. Kappos
*Director of the United States Patent and Trademark Office*